United States Patent
Deck

(10) Patent No.: US 7,327,469 B2
(45) Date of Patent: Feb. 5, 2008

(54) METHOD FOR COMPENSATING ERRORS IN INTERFEROMETRIC SURFACE METROLOGY

(75) Inventor: Leslie L. Deck, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 30 days.

(21) Appl. No.: 11/209,200

(22) Filed: Aug. 22, 2005

(65) Prior Publication Data

US 2006/0221348 A1 Oct. 5, 2006

Related U.S. Application Data

(60) Provisional application No. 60/667,360, filed on Apr. 1, 2005.

(51) Int. Cl.
*G01B 11/02* (2006.01)
(52) U.S. Cl. .................................................. 356/511
(58) Field of Classification Search ................ 356/497, 356/511, 512, 513, 514
See application file for complete search history.

(56) References Cited

U.S. PATENT DOCUMENTS 5,390,023 A * 2/1995 Biegen ........................ 356/497
5,999,263 A * 12/1999 Deck et al. .................. 356/511
6,480,285 B1 * 11/2002 Hill ............................. 356/492

OTHER PUBLICATIONS

Evans, Chris J. et al. "Test optics error removal". Applied Optics, vol. 35, No. 7, Mar. 1, 1996, pp. 1015-1021.*
C.J. Evans, "Compensation for Errors Introduced by Nonzero Fringe Densities in Phase-Measuring Interferometers", *Annals of the CIRP*, vol. 42/1/1993, pp. 577-580.
D. Malacara et al., "Interferogram Evaluation and Wavefront Fitting", *Optical Shop Testing*, Second Edition, John Wiley & Sons, Inc. (1992) Chapter 13, pp. 455-499.

* cited by examiner

*Primary Examiner*—Michael A. Lyons
(74) *Attorney, Agent, or Firm*—Fish & Richardson P.C.

(57) ABSTRACT

A method for determining a surface profile of an object is described. The method typically includes providing a surface profile (e.g., a height profile) of a test object measured by an interferometric profiler. Information related to field- and object orientation-dependent systematic errors of the interferometric profiler is provided. The surface profile is corrected based on the field- and orientation-dependent errors. Also described is a method for determining the field- and orientation-dependent errors of a profiler.

28 Claims, 6 Drawing Sheets

METHOD FOR COMPENSATING ERRORS IN INTERFEROMETRIC SURFACE METROLOGY

CROSS-REFERENCE TO RELATED APPLICATIONS

This application claims the benefit of U.S. provisional application Ser. No. 60/667,360 entitled "METHOD FOR COMPENSATING ERRORS IN INTERFEROMETRIC SURFACE METROLOGY" and filed Apr. 1, 2005, the contents of which is incorporated herein by reference.

FIELD OF INVENTION

The present invention relates to interferometry.

BACKGROUND

Interferometric optical techniques are widely used to measure optical thickness, flatness, and other geometric and refractive index properties of precision optical components such as glass substrates used in lithographic photomasks. For example, to measure the surface profile of a measurement surface, one can use an interferometer to combine a test wavefront reflected from the test surface with a reference wavefront reflected from a reference surface to form an optical interference pattern. The test wavefront and the reference wavefront, typically from a common light source, travel over different optical paths to their respective surfaces and then onto a multidimensional detector (e.g., a charge coupled device (CCD)) having an array of detector elements (e.g., pixels). The wavefronts form an optical interference pattern on the detector. The detector elements record the intensity of the interference pattern at multiple spatial locations. The difference between the lengths of the test and reference optical paths determine an optical path difference (OPD) between the test and reference wavefronts at the detector. Spatial variations in the intensity profile of the interference pattern correspond to phase differences between the combined test and reference wavefronts caused by variations in the profile of the test surface relative to the reference surface.

Phase-shifting interferometry (PSI) can be used to accurately determine the phase differences between the wavefronts and the corresponding profile of a test surface. With PSI, the optical interference pattern is recorded for each of multiple phase-shifts between the reference and test wavefronts to produce a series of optical interference patterns that span at least a full cycle of optical interference (e.g., from constructive, to destructive, and back to constructive interference). For each optical interference pattern in the series, multiple pixels of the detector record intensity values over a lateral spatial region. For each lateral spatial location or "pixel", the series of interference patterns defines a series of intensity values or "interferogram" which has a sinusoidal dependence on phase-shifts producing fringes in the interferogram. Each interferogram is a sinusoid with a phase-offset equal to the phase difference between the combined test and reference wavefronts for that pixel location. Using numerical techniques known in the art, the phase-offset for each spatial location is extracted from the fringes in the interferograms to provide a profile of the test surface relative the reference surface. Such numerical techniques are generally referred to as phase-shifting algorithms.

The phase-shifts in PSI can be produced by changing the optical path length from the test surface to the interferometer relative to the optical path length from the reference surface to the interferometer. For example, the test surface can be moved relative to the reference surface, changing the OPD. An interferogram spanning a full cycle of optical interference can be produced by scanning the OPD over a full wavelength of the common light source. It is therefore unnecessary to scan the OPD over a distance larger than a couple of wavelengths in PSI.

Interferometers using PSI are particularly well-suited for measuring nominally flat surfaces. For example, a single-wavelength visible interferometer using phase-shifting techniques can measure surface variations on the order of Angstroms. Such accuracy is important in applications such as characterizing of glass substrates used in lithographic photomasks. However, for rough surface profiles with step discontinuities or features larger than a wavelength, PSI may suffer from impairments due to $2\pi$ phase ambiguities.

Another type of interferometer is a broadband scanning interferometer, which uses a broadband source and scans the OPD between the reference and test paths of the interferometer. Because the broadband source has a limited coherence length, interference fringes in the interferogram are only present where the OPD between the test and reference paths for corresponding points on the test surface and the reference surface is less than the coherence length. The fringes in the interferogram are localized within a coherence envelope related to the coherence length. Thus, the scanning interferometer can resolve a step or an otherwise large and/or discontinuous variation in the surface of interest by scanning the OPD in a known way, recording multiple interference signals, and determining for each pixel which OPD values produce fringes in the interference signals. This localization of fringes is not impaired by $2\pi$ phase ambiguities. For a simple reflective surface, the coherence envelope has a single peak at zero-OPD. Therefore, in contrast to PSI, broadband scanning interferometry typically scans the OPD over a distance larger than a wavelength in order to scan over a range of height variation in the test surface. See, e.g., N. Balasubramanian in U.S. Pat. No. 4,340,306 and P. de Groot in U.S. Pat. No. 6,195,168 for additional information regarding scanning interferometers. Such broadband scanning interferometry is also referred to as scanning white light interferometry (SWLI). As used herein, SWLI is meant to include the use of broadband sources that emit radiation outside of white visible light (e.g., the term SWLI includes broadband sources that emit ultraviolet and or infrared light).

SUMMARY

The invention features methods and systems for minimizing errors encountered using optical methods for the measurement of surfaces. In preferred embodiments, the method simultaneously corrects for systematic errors arising from a variety of sources, including field curvature and, in the case of interferometric techniques, retrace error. The method can be used with a variety of common surface profiling techniques such as Phase-Shifting Interferometry (PSI) and Scanning White-Light Interferometry (SWLI) and a variety of apparatus platforms, from microscopes to large aperture interferometers.

We now summarize some general aspects and features of the invention.

In general, in one aspect, a method is disclosed including: (i) providing a surface profile of a test object measured by an interferometric profiler; (ii) providing field- and orientation-dependent information about systematic errors in the interferometric profiler; and (iii) using the field- and orientation-dependent information to improve an accuracy of the surface profile of the test object.

The method may include any of the following features.

The field- and orientation-dependent information about systematic errors in the interferometric profiler can provide a height correction for each pixel in a range of pixels in the field of the interferometric profiler for each of multiple orientations of the test object. For example, the multiple orientations of the test object can include rotations about two orthogonal axes each perpendicular to an optical axis of the interferometric profiler.

Also, using the field- and orientation-dependent information to improve the accuracy of the surface profile of the test object, can include determining a height and a local surface orientation for each of multiple pixels in the range of pixels based on the measured surface profile, and correcting the height at each pixel according to the field- and orientation-dependent information about systematic errors in the interferometric profiler and the local surface orientation at that pixel.

The field- and orientation-dependent information about systematic errors in the interferometric profiler can be expressed in terms of a superposition of basis functions, such as Zernike polynomials. The Zernike polynomials are especially useful when the data field is represented as circular aperture.

The method can further include using the interferometric profiler to provide the surface profile of the test object.

The method can further include using the interferometric profiler to provide the field- and orientation-dependent information about systematic errors in the interferometric profiler by using the interferometric profiler to measure a surface profile of a calibration surface over a range of pixels and orientations of the calibration surface. For example, using the interferometric profiler to provide the field- and orientation-dependent information about systematic errors in the interferometric profiler can further include providing separate information about the surface profile of the calibration object and comparing the separate information to the measured surface of the calibration surface over the range of pixels and angular orientations.

The interferometric profiler can include a Mirau, Michelson, Linnik, or Fizeau interferometer.

In another aspect, an article is disclosed that includes a computer readable medium containing a program that causes a processor to carry out the method above.

In general, in another aspect, an apparatus is disclosed including an interferometric profiler configured to measure a surface profile of a test object; and an electronic processor configured to carry out the method described above based on data from the interferometric profiler.

In general, in another aspect, an apparatus is disclosed including: (i) an interferometric profiler configured to measure a surface profile of a test object; and (ii) an electronic processor configured to improve an accuracy of the measured surface profile by using field- and orientation-dependent information about systematic errors in the interferometric profiler. For example, the field- and orientation-dependent information can provide a correction factor at each of multiple pixels in a field of the interferometric profiler as a function of the orientation of the test object at that pixel. The apparatus can further include any of the features described above in connection with the method.

In general, in another aspect, an article is disclosed including a computer readable medium containing a program that causes a processor to improve an accuracy of a surface profile of a test object measured by an interferometric profiler using field- and orientation-dependent information about systematic errors in the interferometric profiler. For example, the field- and orientation-dependent information can provide a correction factor at each of multiple pixels in a field of the interferometric profiler as a function of the orientation orientation of the test object at that pixel. The article can further include any of the features described above in connection with the method.

In general, in another aspect, a method is disclosed including: (i) measuring a surface profile of an object using an optical profiler for each of N different orientations of the object; and (ii) determining a field- and orientation-dependence of systematic errors of the profiler based on the N surface profiles. For example, wherein at least one of the N different surface profiles is a reference surface profile measured with the object having a generally neutral orientation with respect to the profiler and multiple surface profiles of the N different surface profiles are angled surface profiles measured with the object having a generally angled orientation with respect to the profiler. The method can further include any of the features described above in connection with the first disclosed method.

In general, in another aspect, an article is disclosed including a computer readable medium containing a program that causes a processor to carry out the method above.

In general, in another aspect, an apparatus is disclosed including an interferometric profiler configured to measure a surface profile of a test object; and an electronic processor configured to carry out the method described above based on data from the interferometric profiler.

In general, in another aspect, a method is disclosed including: (i) providing a surface profile of a test object measured by an interferometric profiler; and (ii) modifying values of the surface profile based on calibration data indicative of a field- and orientation dependence of the interferometric profiler.

For example, the step of correcting values can include, for at least one of the values, determining an orientation of the test object corresponding to that value. Furthermore, for example, the step of correcting values can further include, for the at least one value, modifying that value based on a field position corresponding to that value and the orientation of the test object corresponding to that value. Furthermore, for example, the field position corresponding to that value can be determined based on a location of a pixel of the interferometric profiler.

The method can further include any of the features described above in connection with the first disclosed method.

In general, in another aspect, an article is disclosed including a computer readable medium containing a program that causes a processor to carry out the method above.

In general, in another aspect, an apparatus is disclosed including an interferometric profiler configured to measure a surface profile of a test object; and an electronic processor configured to carry out the method described above based on data from the interferometric profiler.

Unless otherwise defined, all technical and scientific terms used herein have the same meaning as commonly understood by one of ordinary skill in the art to which this invention belongs. In case of conflict with documents incorporated herein by reference, the present specification controls.

Other features, objects, and advantages of the invention will be apparent from the following detailed description.

DETAILED DESCRIPTION

Figure 1:
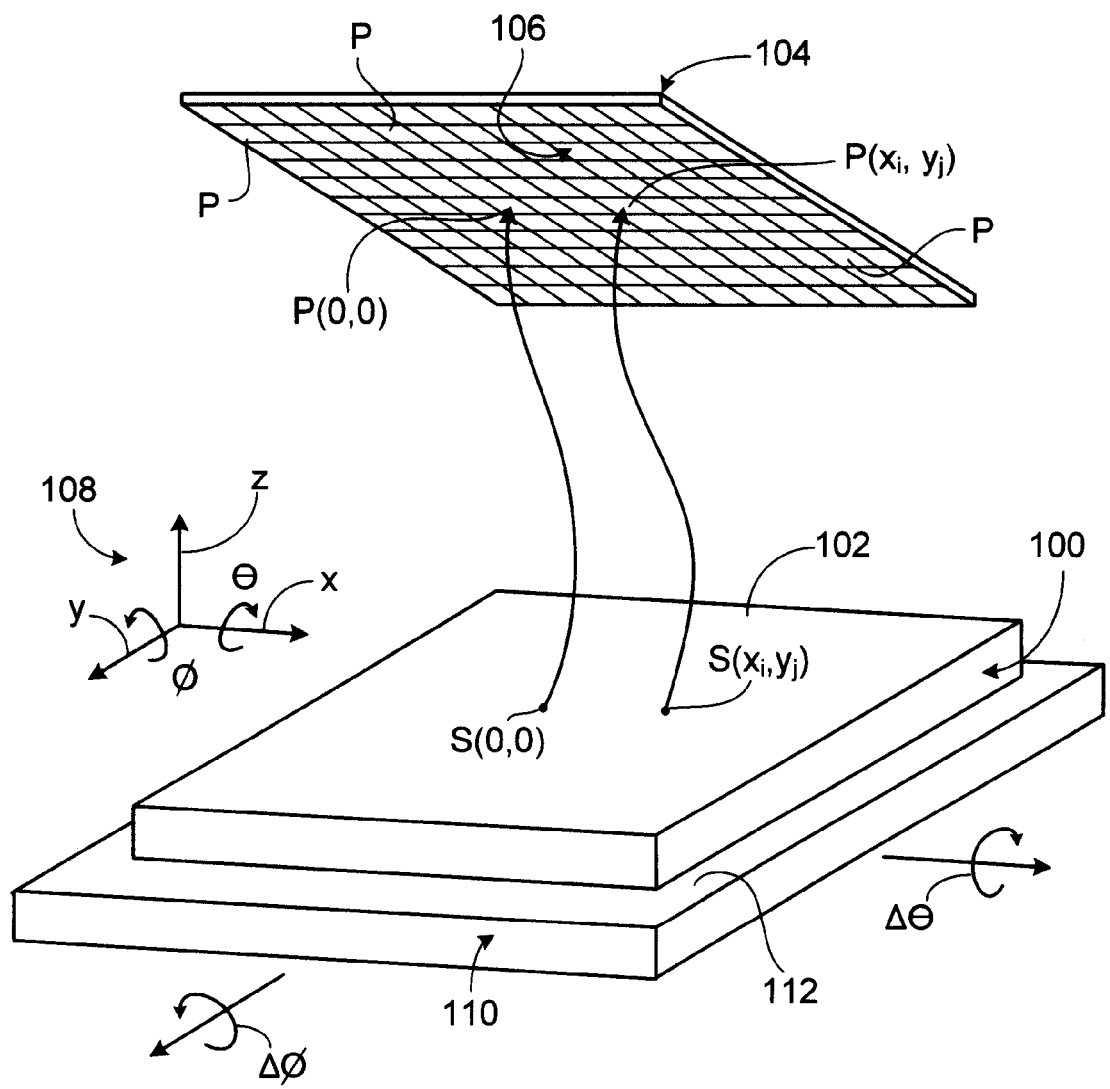
FIG. 1 illustrates correspondence between an object and pixels of a multidimensional detector of an optical profiler. The object is supported by a positioning stage that allows the object to be tipped and/or tilted about orthogonal axes by respective angles tip $\Delta\theta$ and tilt $\Delta\phi$.

We describe methods related to the systematic errors that occur in optical profilers (e.g., optical interferometers such as PSI and SWLI interferometers) as a result of a variety of sources. These errors are typically functions of both field position (e.g., object spatial location, or pixel location) and object orientation. Sources of field- and orientation-dependent systematic errors include, for example, retrace effects. Retrace effects can occur when light reflected from an object surface fails to retrace the exact optical path followed by the light that was incident upon the object. Surface profiles measured for object surfaces that are non-neutrally oriented (e.g., angled) with respect to a profiler tend to have greater field- and orientation-dependent systematic errors than for object surfaces that are more neutrally oriented (e.g., flatter) with respect to the profiler.

In a calibration method, calibration data that provide information related to the field- and orientation-dependent systematic errors of an optical profile are obtained using the optical profiler. Surface profiles of objects measured using the profiler can be corrected based on the calibration data. Thus, in a correction method, a surface profile of an object is corrected based on calibration data for the presence of systematic errors.

In the calibration method, an optical profiler is used to measure the surface profile of a calibration object (e.g., an optical flat) for each of a variety of non-neutral orientations (e.g., angled orientations) of the object. For example, a variety of non-neutral object orientations can be achieved by tipping and/or tilting the object surface by various angles with respect to, for example, a scan dimension of the profiler. The optical profiler is also used to measure a reference surface profile of the calibration object for a neutral orientation (e.g., a relatively flat orientation) of the object with respect to the profiler. For example, a neutral object orientation can be achieved by orienting the object surface so that retrace errors are reduced (e.g., minimized) as compared to retrace errors for the non-neutral orientations of the calibration object. For the reference data, light reflected from the reference surface and calibration surface typically traverse similar (e.g., the same) paths back through the optical system of the profiler before interfering at the detector.

The reference surface profile and the non-neutral surface profiles (e.g., differences between the reference surface profile and non-neutral surface profiles) are examples of calibration data that provide information about the field- and orientation dependent systematic errors of the calibrated profiler.

A correction method can be performed when measuring an unknown test object with a calibrated profiler (e.g., a profiler for which calibration data has been obtained). The correction method involves using the calibrated profiler to measure the surface profile (e.g., height profile) of an object (e.g., an arbitrary object or test object). The profile is corrected at each pixel by an amount that depends on both the position of the pixel within the field of view of the profiler and the orientation of the spatial location of the object that was measured by that pixel. The amount of correction is determined from the calibration data. The correction reduces the field- and orientation-dependent systematic errors caused by the profiler.

Referring to FIG. 1, we describe a calibration method and a correction method with reference to a calibration object 100 and a multidimensional detector 104 (e.g., a CCD) of a profiler (e.g., an interferometer system). Object 102 is supported by a surface 112 of a positioning stage 110 of the system. For clarity, other elements of the interferometer system (e.g., light source, optics, reference surface, scanning mechanism, and processor) are not shown in FIG. 1. We describe an exemplary interferometer system more generally in a subsequent discussion. However, we note that when calibrating a profiler, the reference and calibration surfaces typically have a shape that is similar (e.g., the same).

The interferometer system defines a coordinate system 108. A scan dimension of the interferometer is aligned with the coordinate system z-axis. Object 100 has a planar surface 102 having a plurality of spatial locations $S_{(xi,yj)}$, where the x and y coordinates are with respect to coordinate system 108. A reference spatial location $S_{(0,0)}$ of surface 102 is the geometric center of surface 102.

Multidimensional detector 104 has an array 106 of pixels P arranged in a plane typically perpendicular to the scan dimension of the interferometer system. When object 102 is positioned along the scan dimension, the system images surface 102 onto array 106. Each spatial location $S_{(xi,yj)}$ of surface 102 maps onto a corresponding pixel $P_{(xi,yj)}$.

The actual orientation of various spatial locations $S_{(xi,yj)}$ of surface 102 with respect to the interferometer system can be described in terms of a tip $\Delta\theta$ about the x-axis and a tilt $\Delta\phi$ about the y-axis of coordinate system 108. Because surface 102 is planar, the z-axis is normal to spatial locations $S_{(xi,yj)}$ of surface 102 when tip $\Delta\theta$=tilt $\phi[[\Delta=0°]]$ 0°. The tip $\Delta\theta$ of surface 102 can be changed by rotating positioning stage 110 by a tip $\Delta\theta$ and the tilt $\Delta\phi$ can be changed by rotating positioning stage 110 by a tilt $\Delta\phi$.

To measure a surface profile of surface 102, the profiler is operated to change an OPD between surface 102 and a reference surface (e.g., by scanning the objective through multiple scan positions). For each of multiple OPD's (e.g., for each of multiple scan positions), each pixel $P_{(xi,yj)}$ records an interference intensity related to interference between light reflected from the corresponding spatial location $S_{(xi,yj)}$ and light reflected from the reference surface. For each pixel, the multiple interference intensities are combined to form an interference signal. An interferometry data set includes an interference signal for each of multiple pixels each corresponding to a different spatial location of surface 102.

Based on the interferometry data set, a height $H_{(xi,yj)}$ of the spatial location $S_{(xi,yj)}$ corresponding to each pixel $P_{(xi,yj)}$ of detector 104 is determined. As an example, heights $H_{(xi,yj),k}$ can be determined based on frequency domain analysis (FDA) of the an interferometry data set. The heights $H_{(xi,yj)}$ are typically determined with respect to the z-axis of the interferometer and are typically expressed as relative heights (e.g., the heights can be expressed as relative to a reference location of the object or as relative to a reference location of the profiler). Examples of methods for determining a surface profile from interferometry data of an object are described in U.S. Pat. No. 5,398,113 to de Groot, which patent is incorporated herein by reference.

Figure 2:
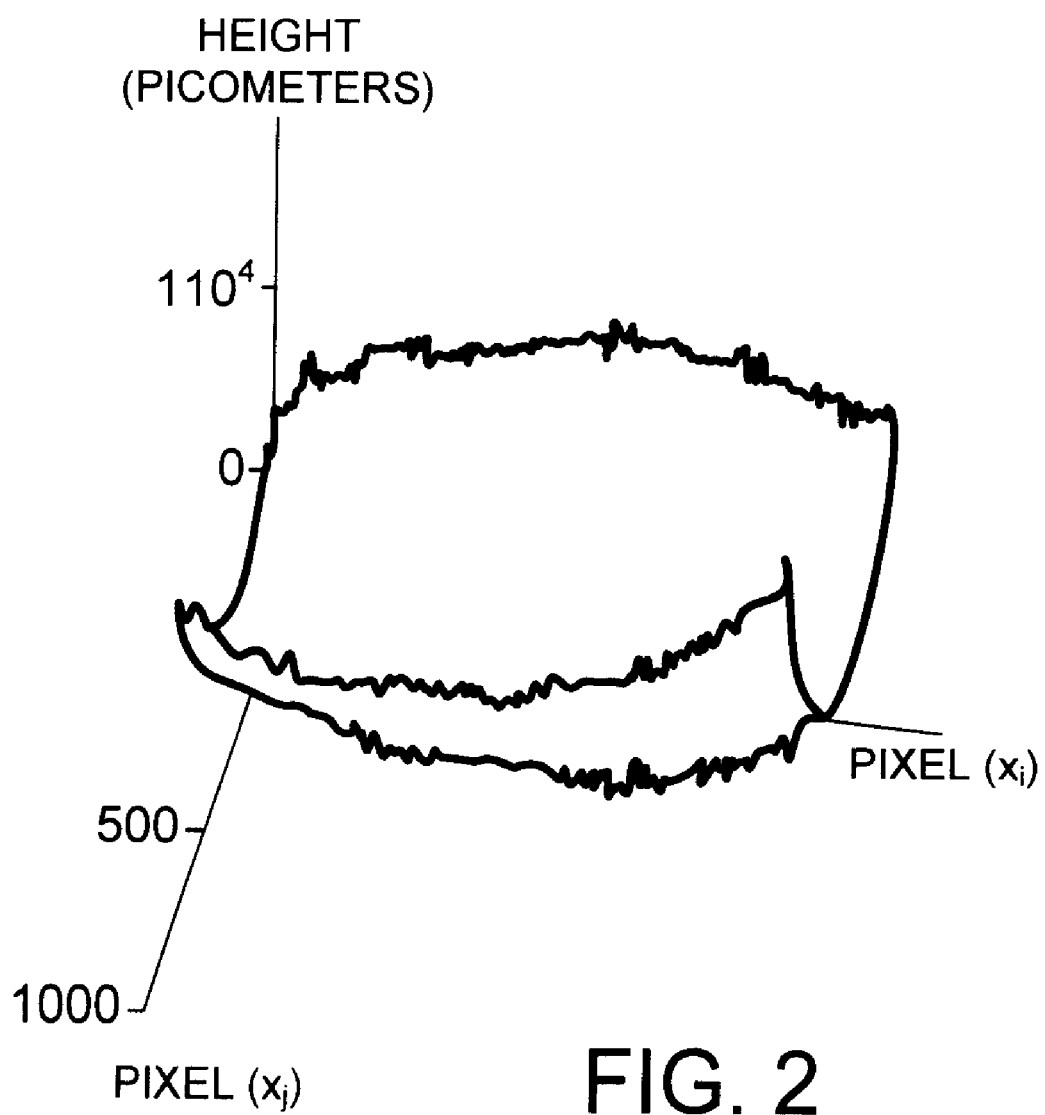
FIG. 2 is a surface map of heights of a test object obtained with an optical profiler. Based on an analysis of the surface map, the test object surface had an actual tip $\Delta\theta$ of 20.62 mrad and an actual tilt $\Delta\phi$ of −8.22 mrad with respect to the profiler scan dimension. The surface map of FIG. 2 is uncorrected for field- and orientation-dependent systematic errors.

FIG. 2 illustrates a surface map of heights $H_{(xi,yj)}$ of an optical flat having a planar outer surface. The heights were determined by FDA analysis of low coherence interferometry data of the optical flat measured using a low coherence interferometer having a 20× interferometric Mirau objective. Prior to measuring the surface profile, a positioning stage of the interferometer was adjusted to impart a non-zero tip $\Delta\theta$ and a non-zero tilt $\Delta\phi$ to the optical flat outer surface. Based on the analysis of the low coherence interferometry data, the tip $\Delta\theta$ was estimated to be 20.62 miliradians (mrad) and the tilt $\Delta\phi$ was estimated to be −8.22 mrad.

The shape of the surface map of heights (FIG. 2) includes contributions from the actual shape and orientation of the optical flat outer surface (i.e., a tipped and tilted plane) and from field- and orientation-dependent systematic errors. For each pixel, the systematic errors are related to the position of that pixel $P_{(xi,yj)}$ within the field of view of the interferometer and to the local orientation of the spatial location $S_{(xi,yj)}$ corresponding to that pixel. Thus, even though the optical flat outer surface was planar, uncorrected field- and orientation-dependent distortions (systematic errors) distort the surface map of heights (FIG. 2). For a given spatial location $S_{(xi,yj)}$ on an object surface, the orientation-dependent distortion typically depends non-linearly on the local orientation of that spatial location. The local orientation itself depends on the shape of the object surface and the orientation of the object as a whole. Additionally, the orientation dependent distortion also depends on the position of the spatial location within the field of view of the interferometer. Thus, the shape of the error surface (e.g., a plot of the height systematic error as a function of spatial location) typically has a low frequency curvature (e.g., cylindrical or saddle-shaped) across the field of view. The field- and orientation-dependent systematic errors distort the heights $H_{(xi,yj)}$ so that the heights do not accurately indicate the relative positions in space of the various spatial locations $S_{(xi,yj)}$.

We next describe a calibration method for obtaining calibration data that provide information related to field- and orientation-dependent distortions of an interferometer. The calibration data include one or more reference interferometry data sets and a number $N_k$ angled interferometry data sets, where k is an index ranging from 1 to N.

The reference interferometry data set(s) is typically obtained with calibration surface 102 at some neutral (e.g., flat) orientation with respect to the scan dimension. For example, a reference interferometry data set can be obtained with the scan dimension (e.g., the z-axis) approximately normal to surface 102 (e.g., by adjusting stage 110 to $\Delta\theta=\Delta\phi=0°$).

The N angled interferometry data sets are obtained with surface 102 oriented at some non-neutral (e.g., angled) orientation such that the scan dimension is not normal to surface 102 (or at least some spatial locations thereof). Typically, the angled interferometry data is obtained with the positioning stage set for a tip $\Delta\theta_m$ and a tilt $\Delta\phi_n$, where m and n are indexes, each ranging independently from 1 to N. The tip $\Delta\theta_m$ and tilt $\Delta\phi_n$ values of the positioning stage for the N angled interferometry data sets are selected to obtain angled interferometry data sets over a range of different non-neutral orientations of surface 102.

Figure 3:
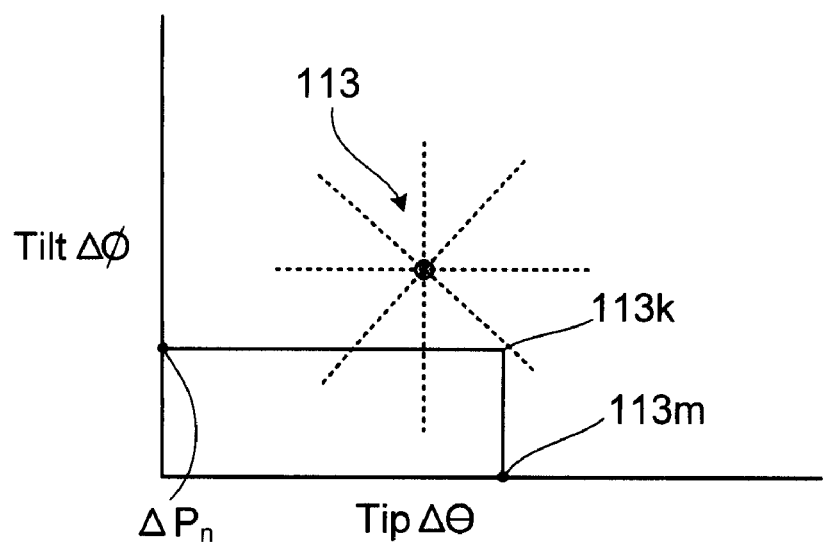
FIG. 3 is a plot of tip $\Delta\theta$ and tilt $\Delta\phi$ angles of the calibration surface as determined from calibration data used to calibrate the profiler of FIG. 2.

FIG. 3 shows an array 113 of 121 points each indicative of the tip $\Delta\theta_m$ and tilt $\Delta\phi_n$ combination of the positioning stage 110 for kth angled interferometry data set (e.g., N=121). For example, a point 113k illustrates the tip $\Delta\theta_m$ and tilt $\Delta\phi_n$ values of the positioning stage for the kth angled interferometry data set. Array 113 includes 15 different tilt amplitudes oriented every 45 degrees in azimuth. Thus, for some angled interferometry data sets, only one of the tip $\Delta\theta_m$ and tilt $\Delta\phi_n$ values of the positioning stage is set to be non-zero. For other angled interferometry data sets, both the tip $\Delta\theta_m$ and tilt $\Delta\phi_n$ values are set to be non-zero.

Typically, the range of tip $\Delta\theta_m$ values (e.g., difference between the maximum tip value ($\Delta\theta_{max}$) and minimum tip value ($\Delta\theta_{min}$) of the N angled interferometry data sets) equals or exceeds the largest tip angle of an unknown object that is expected when applying the calibration data. In some embodiments, the range of tip $\Delta\theta_m$ values is at least about 100 microradians (e.g., at least about 200 microradians). Typically, the range of tip $\Delta\theta_m$ values is about 5000 microradians or less (e.g., about 2500 microradians or less). In an exemplary embodiment, the difference in tip values is about 250 microradians. In general, the range of tilt $\Delta\phi_n$ values (e.g., difference between the maximum tilt value ($\Delta\phi_{max}$) and minimum tilt value ($\Delta\phi_{min}$) of the N angled interferometry data sets) can be similar (e.g., the same) as the range of tip $\Delta\theta$ values.

As discussed next, the kth angled interferometry data set and the reference interferometry data set are used to determine a systematic height error $D_{(xi,yj),k}$ for each pixel $P_{(xi,yj)}$ for the orientation of surface 102 that corresponds to the kth angled interferometry data set. The method typically includes preparing an angled surface map $H_k$ of heights $H_{(xi,yj),k}$ for the kth angled interferometry data set and a reference surface map R of heights $R_{(xi,yj)}$ from the reference interferometry data set. The reference surface map R is subtracted from the kth angled surface map $H_k$ to prepare a difference map Mk of differences $M_{(xi,yj),k}$ each given by $H_{(xi,yj),k}-R_{(xi,yj)}$. A systematic height error surface map $D_k$ of systematic height errors $D_{(xi,yj),k}$ is prepared from the difference map Mk of differences $M_{(xi,yj),k}$. Each systematic height error $D_{(xi,yj),k}$ is indicative of the systematic height error for a corresponding pixel $P_{(xi,yj),k}$ for a corresponding spatial location $S_{(xi,yj),k}$ of an arbitrary object when that spatial location has an orientation that corresponds to the orientation of the kth angled interferometry data set. Because the absolute height of each height error surface map is, in general, arbitrary, a height referenced systematic height error surface map $D'_k$ of height referenced height errors $D'_{(xi,yj),k}$ is prepared by subtracting the systematic height error of a reference pixel from each systematic height error $D'_{(xi,yj),k}$.

The process is repeated for the remaining N−1 angled interferometry data sets. Information from the systematic error maps $D_k$ and $D'_k$ is used to prepare an orientation deviation surface map $A'_{(\Delta\theta,\Delta\phi),P(xi,yj)}$ of the orientation dependence of the systematic errors for each pixel. The resulting N systematic error surface maps (e.g., $D_k$ and $D'_k$) and the orientation deviation surface map $A'_{(\Delta\theta,\Delta\phi),P(xi,yj)}$ are examples of calibration data that can be used to determine the expected systematic height error for the spatial location of an arbitrary object corresponding to each pixel for a range of orientations of that spatial location.

Preparing an angled surface map $H_k$ of heights $H_{(xi,yj),k}$ typically includes using the kth angled interferometry data set to determine the height $H_{(xi,yj),k}$ of the spatial location $S_{(xi,yj)}$ corresponding to each of multiple pixels $P_{(xi,yj)}$. Preparing reference surface map R of heights $R_{(xi,yj)}$ from the reference interferometry data set typically includes using the reference data set to determine the heights $R_{(xi,yj)}$ of the same spatial locations $S_{(xi,yj)}$. For example, heights $H_{(xi,yj),k}$ can be determined based on FDA of the kth angled interferometry data set and the heights $R_{(xi,yj),k}$ can be determined based on FDA of the reference interferometry data set.

Determining systematic height errors $D_{(xi,yj),k}$ continues by determining the differences $M_{(xi,yj),k} = H_{(xi,yj),k} - R_{(xi,yj)}$ between heights $R_{(xi,yj)}$ of reference surface map R and corresponding heights $H_{(xi,yj),k}$ of the kth angled surface map $H_k$. Difference map Mk of differences $H_{(xi,yj),k} - R_{(xi,yj)}$ includes contributions from field- and orientation-dependent systematic height errors because the kth angled interferometry data set was obtained with surface 102 oriented non-neutrally to the scan dimension and the reference interferometry data set was obtained with surface 102 oriented relatively neutral to the scan dimension. Additionally, difference map Mk includes contributions indicative of the actual difference in the orientation of the calibration object surface 102 between the kth angled and reference interferometry data sets.

The field- and orientation-dependent systematic errors typically impart a non-linear (e.g., curved) contribution to the difference map $M_k$. On the other hand, the orientation difference of the calibration object surface typically imparts a planar contribution given by a tipped and tilted plane. The tip and tilt are determined by the actual orientation difference of the calibration object surface 102 between the kth angled and reference data sets. Thus, a height systematic error map $D_k$ of the field- and orientation-dependent distortions can be prepared by subtracting the contribution related to the orientation difference of surface 102 from the difference map Mk.

Subtracting the actual shape and orientation contribution of surface 102 typically includes fitting one or more functions to each surface map Mk of differences $H_{(xi,yj),k} - R_{(xi,yj)}$. In some embodiments, the one or more functions include one or more general functionals (e.g., Zernike polynomials or other basis functions). In general, the function(s) (e.g., general functionals) are sufficient to capture the curved shape of the field- and orientation-dependent systematic errors across the field of view of the interferometer (e.g., the spatial frequency content of the fitted functions encompasses the spatial frequency content of the field-dependence of the systematic height errors to be corrected).

The choice of general functions for fitting may depend on the aperture of the data field. For example, for a circular field of data, Zernike polynomials are preferable because they are orthogonal to one another. As a result, as described in further detail below, certain order Zernike polynomials correspond directly to tip and tilt contributions, and therefore such contributions can be easily extracted from the data. While the Zernike polynomials may also be used for non-circular apertures, in such cases, there may be some residual errors because the Zernike polynomials are not strictly orthogonal to one another. Therefore, in some embodiments, a non-circular aperture for a data field is converted to circular aperture by inscribing a circle in the data field (preferably, the largest circle possible so as to include the most data), and discarding the data points outside this inscribed circle. Of course, in further embodiments that use a non-circular aperture for the date field, the tip and tilt contributions may be fit directly (i.e., without an intermediate fit to an orthogonal set of functions), for example, by performing a least-squares fit for the aperture.

In what follows, we consider the example of a fit by Zernike polynomials to difference map $M_k$ for a circular aperture for the field data. Typically, at least about 9 (e.g., at least about 12 at least about 14) general functionals (e.g., Zernike polynomials) are fit to heights $H_{(xi,yj)}$. In some embodiments, about 20 or fewer (e.g., about 18 or fewer) general functionals are fit to the heights. In an exemplary embodiment, about 16 general functionals (e.g., the first 16 Zernike polynomials) are fit to the heights. Methods for fitting general functionals to data are described by D. Malacara, S. L. Devore in "Interferogram Evaluation and Wavefront Fitting", Chap. 13, of "Optical Shop Testing", 2nd Ed., J. Wiley pub, edited by D. Malacara, which reference is incorporated herein by reference.

Once the fitting coefficients of the Zernike polynomials have been determined, the $2^{nd}$ and $3^{rd}$ fitting coefficients are each set to zero. These coefficients respectively correspond to the tip and tilt of the tipped and tilted plane that represents the contribution to difference map Mk of the actual orientation difference of the calibration object surface 102 between the kth angled and reference data sets. The systematic height error surface map Dk is determined by using only the remaining non-zero coefficients to estimate the best fit to the difference map Mk. Because the $2^{nd}$ and $3^{rd}$ coefficients are set to zero, the tipped and tilted plane is effectively subtracted from the best fit to difference map Mk. Thus, the shape of the systematic height error surface map Dk represents the variation of the systematic height errors across the field of view of the interferometer. The foregoing process is repeated for each of the N angled interferometry data sets.

Figure 4:
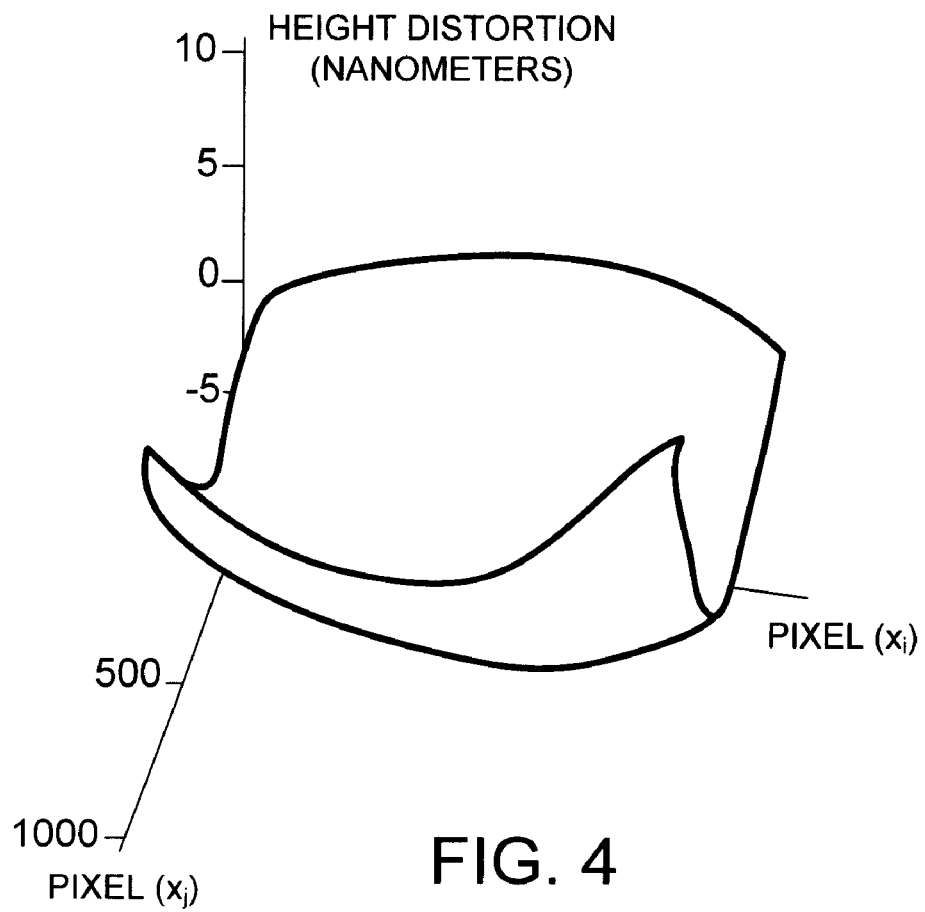
FIG. 4 is a height systematic error map for the pixels of the multidimensional detector of the profiler of FIG. 2 for pixels having a tip $\Delta\theta$ of about 20 mrad and a tilt $\Delta\phi$ of about −8 mrad.

Typically, the height errors $D_{(xi,yj),k}$ of each systematic error surface map are zero centered by subtracting from each systematic height error the systematic height error $D_{(0,0),k}$ expected for a reference spatial location (e.g., $S_{(0,0)}$):

$$D'_{(x_i,y_j),k} = (D_{(x_i,y_j),k} - D_{(0,0),k})$$

where, for each pixel $P_{(xi,yj)}$, each $D'_{(xi,yi),k}$ is a zero centered systematic height error that estimates the height systematic error for that pixel $P_{(xi,yj)}$ when the corresponding spatial location $S_{(xi,yj)}$ has an orientation that corresponds to the actual orientation of surface 102 for the kth angled interferometry data set. FIG. 4 shows a systematic error surface map $D'_k$ determined from an angled interferometry data set for which the calibration object had an orientation similar to that of the optical flat of FIG. 2 (e.g., a tip $\Delta\theta$ of about 20 mrad and a tilt $\Delta\phi$ of about −8 mrad).

Because the calibration surface 102 and the reference surface have the nominally the same shape (e.g., planar) there is no orientation dependence of the systematic errors within a given error surface map. Thus, each of the N error surface maps provides information related to the field-dependence for a single orientation (e.g., a single combination of tip $\Delta\theta$ and tilt $\Delta\phi$ values) of the corresponding spatial locations of objects measured by the interferometer.

Figure 5:
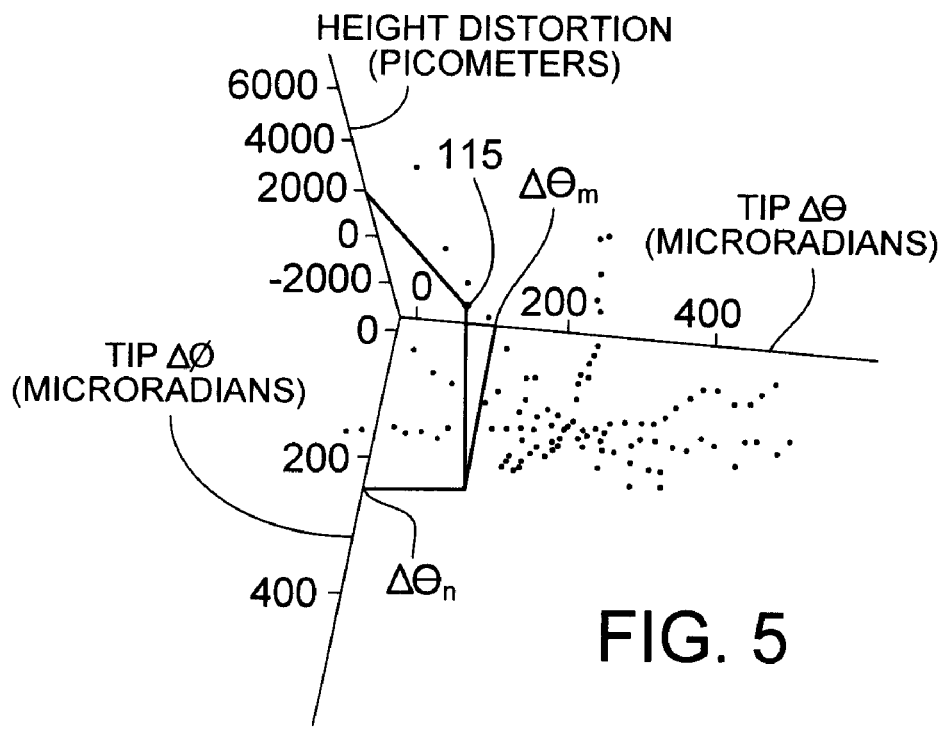
FIG. 5 is a scatter plot of height systematic errors predicted for a single pixel of the multidimensional detector of the profiler of FIG. 2 as determined from calibration data obtained with the tip $\Delta\theta$ and tilt $\Delta\phi$ combinations of FIG. 3.

In some embodiments, the information related to the field- and orientation dependence of the systematic height errors is presented as an orientation deviation scatter plot $A_{(\Delta\theta,\Delta\phi),P(xi,yj)}$ indicative of the orientation-dependence of the field- and orientation dependence of the systematic height errors for a single pixel. For example, FIG. 5 illustrates an orientation deviation scatter plot $A_{(\Delta\theta,\Delta\phi),P(10,10)}$, which is the height error $D'_{(10,10),k}$ as a function of the actual local surface orientation (e.g., as described by the actual tip $\Delta\theta$ and tilt $\Delta\phi$ value) of the spatial location $S_{(10,10)}$ corresponding to pixel $P_{(10,10)}$ for each of the N angled interferometry data sets. As a particular example, a point 115 indicates that the interferometer will determine the height of an arbitrary object spatial location corresponding to pixel $P_{(xi,yj)}$ as too high by about 2000 picometers when that spatial location is tipped by angle $\Delta\theta$ and tilted by an angle $\Delta\phi$. Note that the tip $\Delta\theta$ and tilt $\Delta\phi$ values of FIG. 5 are determined from the calibration data unlike the tip $\Delta\theta_m$ and tilt $\Delta\phi_n$ values of FIG. 3, each of which corresponds to one of N settings of the positioning stage 110.

For a detector with a number $N_p$ pixels, one can prepare a number $N_p$ orientation deviation scatter plots $A_{(\Delta\theta,\Delta\phi),P(xi,yj)}$ each similar to FIG. 5 but indicative of the orientation-dependence of the field- and orientation-dependent systematic errors for a different pixel. Given that Np can be quite large (e.g., about 1000 or more, about 5000 or more), the amount of calibration data can be quite large. Additionally, each point in the scatter plot of FIG. 5 describes the expected height error for a single orientation. In measuring objects generally, spatial locations may have an orientation that falls between orientations for which calibration data was obtained. Accordingly, we next describe an efficient method for representing calibration data that also allows determination of the height error for spatial locations having an orientation that falls between orientations of the calibration data.

Figure 6:
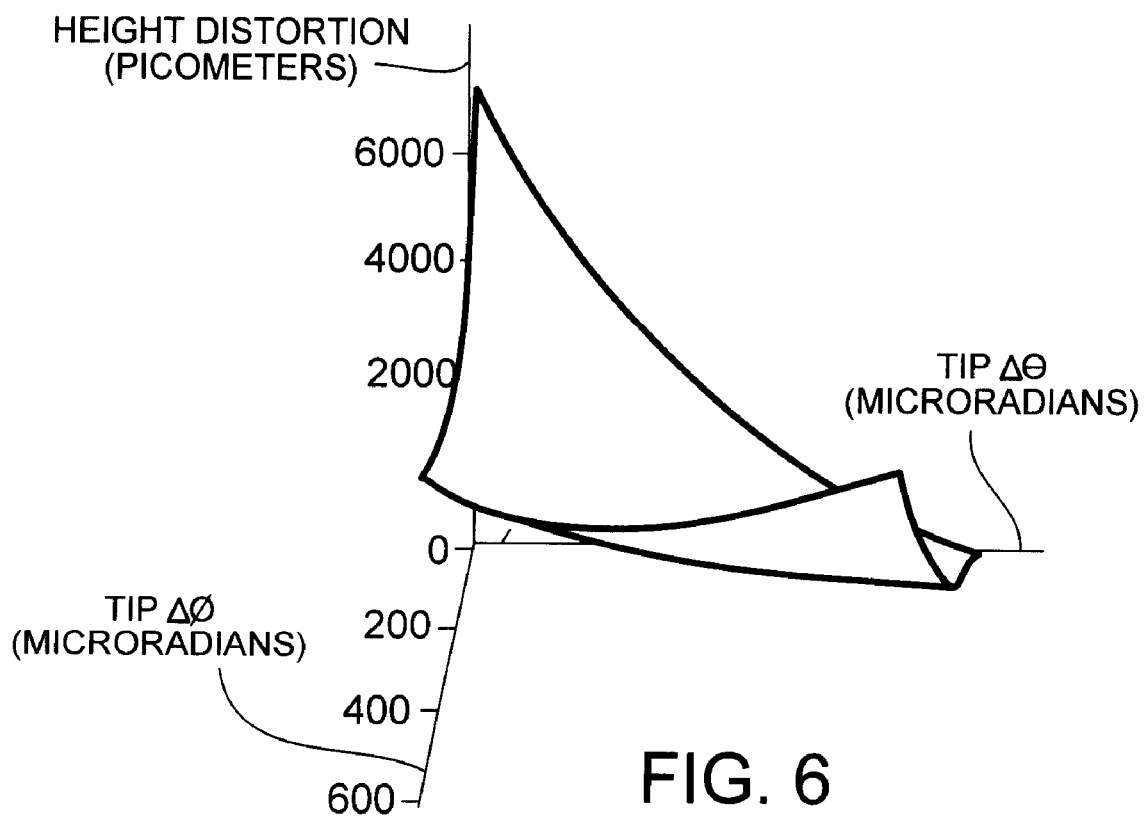
FIG. 6 is a surface representation of the height systematic errors for the pixel of FIG. 5 as determined from a fit of Zernike polynomials to the scatter plot of FIG. 5.

Typically, the method includes fitting the orientation-dependence of the height systematic errors (e.g., each orientation deviation scatter plot $A_{(\Delta\theta,\Delta\phi),P(xi,yj)}$) to one or more functions or general functionals (e.g., Zernike polynomials or other basis functions). Coefficients from the fit(s) can be used to estimate the height systematic error for any pixel for any orientation of an object spatial location corresponding to that pixel. The orientation dependence of the field- and orientation-dependent errors can be represented as an orientation deviation surface map $A'_{(\Delta\theta,\Delta\phi),P(xi\ yj)}$. For example, FIG. 6 illustrates an orientation deviation surface map $A'_{(\Delta\theta,\Delta\phi),P(10,10)}$ estimated from the best-fit coefficients of an 8 Zernike polynomial fit to the orientation scatter plot $A_{(\Delta\theta,\Delta\phi),P(10,10)}$ of FIG. 5. Typically, the height systematic errors estimated from the fitting coefficients are more precise (e.g., has lower random noise) than the height systematic errors D(xi,yj),k or D'(xi,yj),k.

We now describe a correction method for correcting surface profiles measured with a profiler based on the field- and orientation dependence of height systematic errors as determined from calibration data of that profiler. Typically, data related to a surface profile of an object (e.g., an arbitrary or unknown test object) is obtained using a profiler. For example, the profiler may be used to obtain interferometry data that include an interference signal (e.g., a low coherence interference signal) for each of multiple pixels of a detector, where each pixel corresponds to a different surface location of the object. An uncorrected surface profile $H_u$ of uncorrected heights $H_{(xi,yj),u}$ is determined based on the data (e.g., by FDA of the data). The orientation (e.g., the tip $\Delta\theta$ and tilt $\Delta\phi$ value) of the spatial location $S_{(xi,yj)}$ corresponding to each pixel $P_{(xi,yj)}$ is determined. For example, the orientation can be determined by, for example, fitting multiple Zernike polynomials to the heights and determining the orientation from the $2^{nd}$ and $3^{rd}$ fitting coefficients.

The systematic height error for each pixel $P_{(xi,yj)}$ is determined based on the calibration data and the orientation (e.g., the $\Delta\theta$ and tilt $\Delta\phi$ value) of the spatial location that corresponds to that pixel. For example, the systematic height error can be determined from the systematic height errors $D_{(xi,yj),k}$ or $D'_{(xi,yj),k}$ or from the orientation-dependence of the field- and orientation dependent errors (e.g., using the orientation deviation maps $A'_{(\Delta\theta,\Delta\phi),P(xi,yj)}$) A corrected surface profile $H_c$ of corrected heights $H_{(xi,yj),c}$, is determined based on each uncorrected height $H_{(xi,yj),u}$ and the corresponding systematic height error. For example, the corrected heights $H_{(xi,yj),u}$ can be determined by subtraction of the systematic height error (e.g., as $H_{(xi,yj),c}=H_{(xi,yj),u}-D'_{(xi,yj)}$).

While certain embodiments of methods related to systematic errors have been described, other embodiments are possible.

While reference spatial location $S_{(0,0)}$ has been described as being located at the geometric center of surface 102, other reference spatial locations can be used. For example, a reference spatial location may correspond to a pixel aligned with an edge or corner of an object. Typically, the same reference spatial location is used consistently throughout calibration step and/or correction.

While the calibration method has been described as subtracting the contribution of the actual shape and orientation of the calibration surface (e.g., a tipped and/or tilted plane) from the difference between each angled interferometry surface map and the reference surface map, other embodiments may be used. For example, the contribution of the actual shape and orientation of the calibration surface can be subtracted from each surface map $M_k$ and R prior to determining the differences between these surface maps (e.g., prior to determining the differences $H_{(xi,yj),k}-R_{(xi,yj)}$). In this case, the distortion surface map $D_k$ may result directly from the difference $H_k-R$.

While the method has been described as including an estimation of a best fit surface using only some best fit coefficients to subtract the contribution of orientation of the calibration surface from the difference map Mk, other embodiments may be used. For example, a theoretical model (e.g., a plane) can be fit to the difference map Mk (e.g., by least-squares). The best-fit model estimated from the fitting coefficients is subtracted from the difference map Mk. The residuals from the subtraction describe the higher order (e.g., curved) field- and orientation-dependence of the systematic height errors.

Alternatively, one or more general functionals (e.g., Zernike polynomials or other basis functions) can be fit to the difference map Mk. The number of general functionals is sufficient to capture the actual shape and orientation of the calibration surface but insufficient to capture the shape of the field- and orientation-dependent distortions. Typically, at least about 3 (e.g., at least about 5 at least about 7) general functionals (e.g., Zernike polynomials) are fit to the surface map. In some embodiments, about 12 or fewer (e.g., about 10 or fewer) general functionals are fit to the surface map. In an exemplary embodiment, about 9 general functionals (e.g., the first 9 Zernike polynomials) are fit to the surface map.

Figure 7:
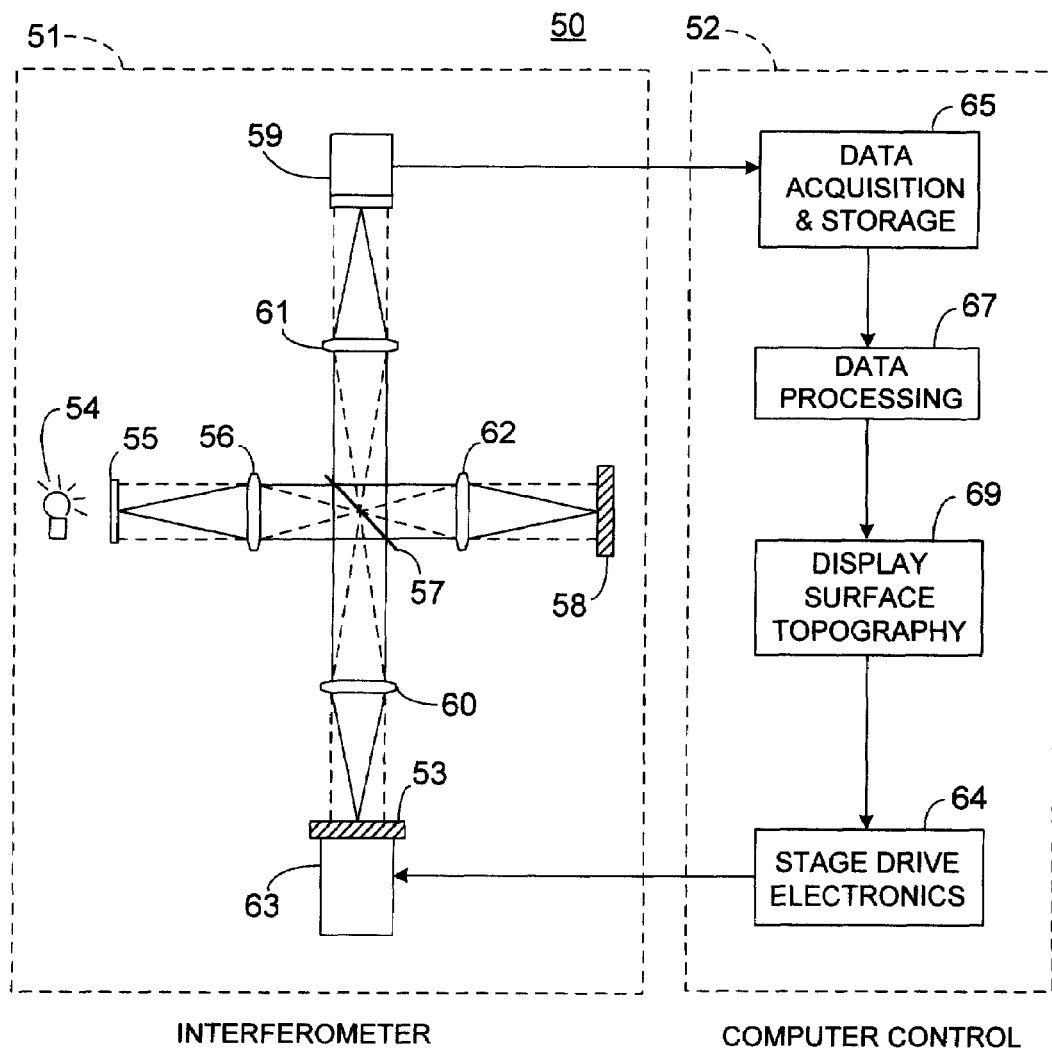
FIG. 7 is an optical interferometer system.

Referring now to FIG. 7, we describe an exemplary interferometer system 50 for obtaining optical interferometry data (e.g., optical interferometry data including low coherence interference signals). System 50 includes an interferometer 51 and a processor 52 (e.g., an automated computer control system). The measurement system 50 is operable to obtain scanning interferometry data of spatial locations of a test object 53. Calibration and correction steps can be applied to interferometer systems including system 50.

Measurement system 50 includes a light source 54, a first focusing optic (e.g., one or more lenses) 56, a beam splitting element 57, a second focusing optic 62, a reference object 58, a third focusing optic 60, and a detector 59. Light source emits 54 emits spectrally-broadband light (e.g., white light), which illuminates a diffusing screen 55. First focusing optic 56 collects light from screen 55 and transmits collimated light to beam-splitting element 57, which splits the collimated light into first and second portions. A first portion of the collimated light is received by second focusing optic 62, which focuses the first portion of the light onto reference object 58. Light reflected from the reference object is received by second focusing optic 62, which transmits collimated light reflected by the reference object 58 back to beam-splitting element 57. Beam-splitting element 57 directs the second portion of the collimated light to third focusing optic 60, which focuses the light onto test object 53. Light reflected from test object 53 is received by third focusing optic 60, which transmits collimated light reflected by test object 53 back to beam-splitting element 57. Beam-splitting element 57 combines light reflected from reference object 58 and test object 53 and directs the combined light to a fourth focusing optic 61, which focuses the combined light to a detector 59.

Detector 59 is typically a multidimensional detector (e.g., a charge coupled device (CCD) or charge injection device (CID)) having a plurality of detector elements (e.g., pixels) arranged in one or more dimensions (e.g., two dimensions). Optics 60 and 61 focus light reflected from test object 53 onto detector 59 so that each detector element of detector 59 receives light reflected from a corresponding spatial location (e.g., a point or other small region) of test object 53. Light reflected from respective spatial locations of test object 53 and light reflected from reference object 58 interferes at detector 59. Each detector element produces a detector signal related to the intensity of the interfering light.

System 50 is configured to measure interference signals related to spatial locations of test object 53. Typically, system 50 creates an OPD between light reflected from reference object 58 and light reflected from test object 53. For example, test object 53 can be displaced through a number of scan positions along a scan dimension axis by a scan mechanism (e.g., an electromechanical transducer 63 (e.g., a piezoelectric transducer (PZT)), and associated drive electronics 64) controlled by computer 52. In some embodiments, a scan position increment between successive scan positions is at least about $\lambda/15$ (e.g., at least about $\lambda/12$, at least about $\lambda/10$), where $\lambda$ is a mean wavelength of the light detected at each pixel.

For each scan position, detector 59 outputs an intensity value (e.g., the intensity detected by a given detector element) for each of multiple different spatial locations of the test object. Taken along the scan dimension, the intensity values for each spatial location define an interference signal corresponding to the spatial location. The intensity values corresponding to a common scan position define a data set (e.g., an interferogram) for that scan position. System 50 can detect intensity values over a range of scan positions that is greater than the width of a coherence envelope of the detected interference signals and, therefore, greater than the coherence length of the detected light.

Processor 52 can be configured to acquire and/or store data 65, process data 67 (e.g., as described herein), display 69 surface topographies, and operate 64 components of interferometer 51. In general, any of the methods described above can be implemented, for example, in computer hardware, software, or a combination of both. The methods can be implemented in computer programs using standard programming techniques following the descriptions herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein.

The calibration and correction methods described herein are not limited to a particular type of profiler. Instead, the methods are applicable to a wide range of interferometric profilers. Examples of suitable profilers include Michelson, Mirau, Linnik, and Fizeau interferometers. The profiler may be operated in a high coherence mode using, for example, highly coherent laser light and by scanning the OPD by a distance smaller than the coherence length of the light. As another example, the profiler may be operated as a low coherence profiler using, for example, a low coherence length (e.g., broadband) light source and by scanning the OPD by a distance greater than the coherence length of the light. Examples of profilers include PSI and SWLI interferometers. The profiler may have a small aperture or a large aperture (e.g., as a profiler with a microscope objective (e.g., a Mirau or Michelson objective)).

The calibration and correction methods described herein are not limited to a particular type of data analysis method. Instead, a wide range of methods for determining height information from interferometric data including any of the data analysis methods described herein can be used. Examples of data analysis methods include those disclosed in any of the following commonly owned patents or published patent applications may be used for the calibration and correction steps described herein: U.S. Pat. No. 6,359,692, entitled "METHOD AND SYSTEM FOR PROFILING OBJECTS HAVING MULTIPLE REFLECTIVE SURFACES USING WAVELENGTH-TUNING PHASE-SHIFTING INTERFEROMETRY," by Peter de Groot; U.S. Patent Publication No. US-2003-0160968-A, entitled "PHASE SHIFTING INTERFEROMETRY METHOD AND SYSTEM," by Leslie Deck; U.S. Patent Publication No. US-2004-0252310-A1, entitled "SCANNING INTERFEROMETRY," by Xavier Colonna de Lega; and U.S. Patent Publication No. US-2004-0189999-A1, entitled "PROFILING COMPLEX SURFACE STRUCTURES USING SCANNING INTERFEROMETRY," by Peter de Groot et al., all of which are incorporated herein by reference.

While scanning interferometry data have been described as being obtained by varying an OPD (e.g., by moving a test and/or reference object), other configurations are possible. For example, in some embodiments, scanning interferometry data are obtained by varying a wavelength of the light that interferes at the detector. Each scan position typically corresponds to a different wavelength of detected interfering light (e.g., to a different central wavelength of the detected interfering light). Each scan position increment typically corresponds to a difference in the wavelength between scan positions.

EXAMPLES

In what follows, by way of example only, calibration and correction are illustrated with respect to the specific example of a microscope with a 20× interferometric Mirau objective. The microscope included a multidimensional detector having a plurality of pixels. Each pixel could record a low coherence interference signal corresponding to a different spatial location of an object. Based on the low coherence interference signals, a height of the spatial location corresponding to each pixel could be determined.

Example 1

Calibration

A known SiC flat was used as the calibration object. The geometric center of the SiC flat was selected as a reference spatial location $S_{(0,0)}$. The SiC flat was mounted on a positioning stage of the microscope. The positioning stage allowed the SiC flat to be tipped by an angle $\Delta\theta_m$ about a first axis and independently tilted by an angle $\Delta\phi_n$ about a second axis. The first and second axes were orthogonal to one another and each axis was orthogonal to a scan dimension of the microscope. The tip and tilt axes intersected the profiler optical axis at the scan center position so that lateral shifting of the calibration object due to tip and/or tilt was minimized.

A total of 121 angled interferometry data sets were obtained each for a different non-neutral orientation of the SiC flat outer surface. The tip and tilt values $\Delta\theta_m$ and $\Delta\phi_n$ corresponded to those of array 113 of FIG. 3. FDA was used to determine the heights $H_{(xi,yj),k}$ for each angled interferometry data set and the heights $R_{(xi,yj),k}$ for the reference interferometry data set.

Difference maps $M_k$ were prepared by subtracting the reference heights $R_{(xi,yj),k}$ from each set of heights $H_{(xi,yj),k}$. Each difference map Mk was fit to 16 Zernike polynomials. The $1^{st}$ and $2^{nd}$ fitting coefficients of each fit were set to zero. A systematic height error surface map $D_k$ was estimated from the non-zeroed coefficients of each fit. Zero centered systematic height error maps $D'_k$ were prepared using the estimated height error of the reference spatial location. An orientation deviation scatter plot $A_{(\Delta\theta,\Delta\phi),P(xi,yj)}$ was prepared for each pixel. An orientation deviation surface map $A'_{(\Delta\theta,\Delta\phi),P(xi,yj)}$ was estimated from the fitting coefficients of an 8 Zernike polynomial fit to each orientation scatter plot.

Example 2

Correction

A test object having a planar outer surface was positioned on the position stage. The positioning stage was set to impart an arbitrary orientation to the outer surface of the test object. An interferometry data set was obtained from the test object. FDA was used to determine the height of multiple spatial locations of the outer surface. FIG. 2 shows that a surface map of the heights exhibits curvature resulting from uncorrected field- and orientation-dependent systematic errors.

The tip $\Delta\theta$ and tilt $\Delta\phi$ values of each spatial location were determined from a fit of Zernike polynomials to the heights. In this example, the surface locations of the test object were found to have an average tip $\Delta\theta$ of 20.62 mrad and an average tilt $\Delta\phi$ of −8.22 mrad.

Figure 8:
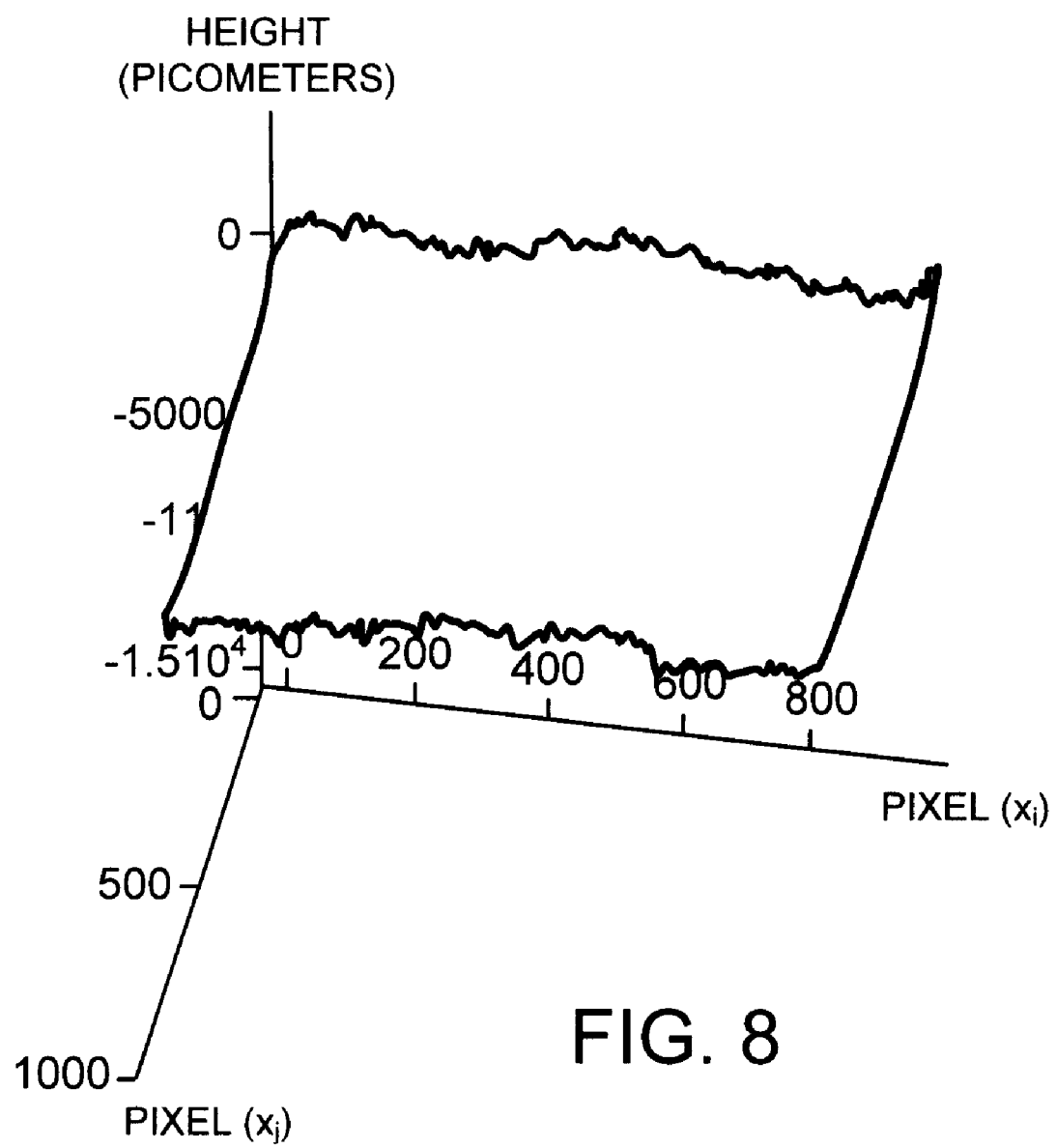
FIG. 8 is a surface map of the heights of FIG. 2 after correction based on the calibration data of FIG. 3.

The systematic height error of each spatial location was determined from the tip $\Delta\theta$ and tilt $\Delta\phi$ values of that spatial location and the fitting coefficients of the corresponding orientation deviation scatter plot $A_{(\Delta\theta,\Delta\phi),P(xi,yj)}$. Each systematic height error was subtracted from the corresponding height of the test object. FIG. 8 shows that a surface map of the corrected heights is essentially planar as was the surface of the test object. The standard deviation of the surface map of uncorrected heights (FIG. 2) is 3.6 nanometers and the standard deviation of the surface map of corrected heights (FIG. 8) is 0.45 nanometers.

Other aspects, features, and advantages are within the scope of the invention.

What is claimed is:

1. A method comprising:
    providing a surface profile of a test object measured by an interferometric profiler;
    providing field- and orientation-dependence information about systematic errors in the interferometric profiler; and
    using the field- and orientation-dependence information to improve an accuracy of the surface profile of the test object,
    wherein the field- and orientation-dependence information about systematic errors in the interferometric profiler provides a correction factor for each pixel in a range of pixels in the field of the interferometric profiler for each of multiple orientations of the test object.

2. The method of claim 1, wherein each correction factor is a height correction.

3. The method of claim 2, wherein the multiple orientations of the test object include rotations about two orthogonal axes each perpendicular to an optical axis of the interferometric profiler.

4. The method of claim 2, wherein using the field- and orientation-dependence information to improve the accuracy of the surface profile of the test object, comprises determining a height and a local surface orientation for each of multiple pixels in the range of pixels based on the measured surface profile, and correcting the height at each pixel according to the field- and orientation-dependence information about systematic errors in the interferometric profiler and the local surface orientation at that pixel.

5. The method of claim 2, wherein field- and orientation-dependence information about systematic errors in the interferometric profiler is expressed in terms of a superposition of basis functions.

6. The method of claim 5, wherein the basis functions are Zernike polynomials.

7. The method of claim 1, further comprising using the interferometric profiler to provide the surface profile of the test object.

8. The method of claim 1, wherein the interferometric profiler comprises a Mirau, Michelson, Linnik, or Fizeau interferometer.

9. An article comprising a computer readable medium containing a program that causes a processor to carry out the method of claim 1.

10. An apparatus comprising:
an interferometric profiler configured to measure a surface profile of a test object; and
an electronic processor configured to carry out the method of claim 1 based on data from the interferometric profiler.

11. A method comprising:
providing a surface profile of a test object measured by an interferometric profiler;
providing field- and orientation-dependence information about systematic errors in the interferometric profiler;
using the field- and orientation-dependence information to improve an accuracy of the surface profile of the test object; and
using the interferometric profiler to provide the field- and orientation-dependence information about systematic errors in the interferometric profiler by using the interferometric profiler to measure a surface profile of a calibration surface over a range of pixels and orientations of the calibration surface.

12. The method of claim 11, wherein using the interferometric profiler to provide the field- and orientation-dependence information about systematic errors in the interferometric profiler further comprises providing separate information about the surface profile of calibration object and comparing the separate information to the measured surface of the calibration surface over a range of pixels and angular orientations.

13. An article comprising a computer readable medium containing a program that causes a processor to improve an accuracy of a surface profile of a test object measured by an interferometric profiler using field- and orientation-dependence information about systematic errors in the interferometric profiler, wherein the field- and orientation-dependence information provides a correction factor at each of multiple pixels in a field of the interferometric profiler as a function of the orientation of the test object at that pixel.

14. An apparatus comprising:
an interferometric profiler configured to measure a surface profile of a test object; and
an electronic processor configured to improve an accuracy of the measured surface profile by using field- and orientation-dependence information about systematic errors in the interferometric profiler,
wherein the field- and orientation-dependence information provides a correction factor at each of multiple pixels in a field of the interferometric profiler as a function of the orientation of the test object at that pixel.

15. A method, comprising:
measuring a surface profile of an object using an optical profiler for each of N different orientations of the object; and
determining a field- and orientation-dependence of systematic errors of the profiler based on the N surface profiles,
wherein at least one of the N different surface profiles is a reference surface profile measured with the object having a generally neutral orientation with respect to the profiler and multiple surface profiles of the N different surface profiles are angled surface profiles measured with the object having a generally angled orientation with respect to the profiler.

16. An article comprising a computer readable medium containing a program that causes a processor to carry out the method of claim 15.

17. An apparatus comprising:
an interferometric profiler configured to measure a surface profile of a test object; and
an electronic processor configured to carry out the method of claim 15 based on data from the interferometric profiler.

18. The method of claim 15, wherein, further comprising:
outputting information based on the field- and orientation-dependence of systematic errors of the profiler.

19. An article comprising a computer readable medium containing a program that causes a processor to carry out the method of claim 18.

20. The method of claim 15, further comprising:
improving the accuracy of the profile based on the field- and orientation-dependence of systematic errors of the profiler.

21. A method, comprising:
providing a surface profile of a test object measured by an interferometric profiler; and
modifying values of the surface profile based on calibration data indicative of a field- and orientation-dependence of the interferometric profiler.

22. The method of claim 21, wherein the step of modifying values comprises, for at least one of the values, determining an orientation of the test object corresponding to that value.

23. The method of claim 22, wherein the step of modifying values further comprises, for the at least one value, modifying that value based on a field position corresponding to that value and the orientation of the test object corresponding to that value.

24. The method of claim 23, wherein the field position corresponding to that value is determined based on a location of a pixel of the interferometric profiler.

25. An article comprising a computer readable medium containing a program that causes a processor to carry out the method of claim 21.

26. An apparatus comprising:
an interferometric profiler configured to measure a surface profile of a test object; and
an electronic processor configured to carry out the method of claim 21 based on data from the interferometric profiler.

27. The method of claim 21, wherein, further comprising:
outputting information based on the surface profile.

28. An article comprising a computer readable medium containing a program that causes a processor to carry out the method of claim 27.

* * * * *